US011698735B2

(12) United States Patent
Tanaka et al.

(10) Patent No.: US 11,698,735 B2
(45) Date of Patent: Jul. 11, 2023

(54) COMMON STORAGE MANAGEMENT DEVICE AND COMMON STORAGE MANAGEMENT METHOD

(71) Applicant: DENSO CORPORATION, Kariya (JP)

(72) Inventors: Yusuke Tanaka, Kariya (JP); Yuka Ito, Kariya (JP); Hajime Nomura, Kariya (JP); Daishi Miyata, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/485,560

(22) Filed: Sep. 27, 2021

(65) Prior Publication Data

US 2022/0100401 A1    Mar. 31, 2022

(30) Foreign Application Priority Data

Sep. 30, 2020  (JP) ................. 2020-165363

(51) Int. Cl.
*G06F 3/06*  (2006.01)

(52) U.S. Cl.
CPC .......... *G06F 3/0631* (2013.01); *G06F 3/0604* (2013.01); *G06F 3/067* (2013.01); *G06F 3/0653* (2013.01); *G06F 3/0659* (2013.01)

(58) Field of Classification Search
CPC .... G06F 3/0604; G06F 3/0631; G06F 3/0652; G06F 3/0653; G06F 3/0659; G06F 3/067; G06F 3/0671
See application file for complete search history.

(56) References Cited

U.S. PATENT DOCUMENTS

2004/0243900 A1   12/2004  Henkel
2021/0264237 A1*   8/2021  Kim ..................... G06N 3/0454

FOREIGN PATENT DOCUMENTS

JP        2004-362567 A     12/2004

\* cited by examiner

*Primary Examiner* — Yong J Choe
(74) *Attorney, Agent, or Firm* — Harness, Dickey & Pierce, P.L.C.

(57) ABSTRACT

A common storage management device for a system including a common storage and at least one computer includes at least one processor, the at least one computer storing a plurality of applications configured to write and read data in the common storage. The at least one processor is configured to manage a reservation and a release of a storage space of the common storage in response to a request from the plurality of applications. The at least one processor is configured to assign a releasing priority to each storage space of the common storage that is reserved. The at least one processor is configured to instruct to release the storage space with highest releasing priority when the plurality of applications request to reserve the storage space for the data and free storage space is insufficient for reserving the storage space for the data.

7 Claims, 6 Drawing Sheets

EXAMPLE 1: FREE SPACE OF COMMON STORAGE 40MB

| REQUEST ORDER | REQUIRED SIZE (MB) | DATA TYPE | RESERVING PRIORITY |
|---|---|---|---|
| 1 | 200 | 1 | −0.25 |
| 2 | 500 | 1 | −2.375 |
| 3 | 20 | 0 | 0.125 |

EXAMPLE 2: FREE SPACE OF COMMON STORAGE 150MB

| REQUEST ORDER | REQUIRED SIZE (MB) | DATA TYPE | RESERVING PRIORITY |
|---|---|---|---|
| 1 | 200 | 1 | 0.667 |
| 2 | 500 | 1 | −0.083 |
| 3 | 20 | 0 | 0.217 |

# COMMON STORAGE MANAGEMENT DEVICE AND COMMON STORAGE MANAGEMENT METHOD

CROSS REFERENCE TO RELATED APPLICATION

This application is based on and incorporates herein by reference Japanese Patent Application No. 2020-165363 filed on Sep. 30, 2020.

TECHNICAL FIELD

The present disclosure relates to a common storage management device and a common storage management method for a system installed in a vehicle such as an automobile.

BACKGROUND

A vehicle such as an automobile is equipped with a system including electronic devices called ECUs (Electronic Control Units), which include computers, connected with each other through a network using CAN, Ethernet, etc. Applications are provided in each ECU, and information is exchanged between the applications. The ECUs include a communication device configured to communicate with the outside of the vehicle to perform data communication with an external device. For example, the data of the drive recorder is uploaded to the cloud, or update programs and various data are downloaded from outside.

The applications temporarily uses storage space for uploading and downloading data, but preparing a dedicated storage space in each ECU may be wasteful. In view of the above points, a common storage may be provided in one ECU, and the applications may write and delete data to and from the common storage at any given time. In one known method, when recording data in a storage, a storage having a free space is determined from multiple storages provided in the system, and the data is recorded in the determined storage. In this way, the multiple storages can be utilized as if the multiple storages are one storage. An arbitration unit may be provided to adjust an access to the common storage by the applications.

SUMMARY

According to a first aspect of the present disclosure, a common storage management device is configured to be used for a system including a common storage and at least one computer connected with each other by a closed network. The at least one computer including one computer is configured to communicate with an outside. The at least one computer stores a plurality of applications configured to communicate with each other. The plurality of applications are configured to write and read data in the common storage. The common storage management device includes at least one processor configured to manage a reservation and a release of a storage space of the common storage in response to a request from the plurality of applications. The at least one processor is configured to assign a releasing priority to each storage space of the common storage that is reserved. The at least one processor is configured to instruct to release the storage space with highest releasing priority when the plurality of applications request to reserve the storage space for the data and free storage space is insufficient for reserving the storage space for the data.

According to a second aspect of the present disclosure, a method of managing a common storage is used for a system including the common storage and at least one computer connected with each other by a closed network. The at least one computer includes one computer configured to communicate with an outside. The at least one computer stores a plurality of applications configured to communicate with each other. The plurality of applications are configured to write and read data in the common storage. The method includes reserving a storage space of the common storage in response to a request from the plurality of applications to reserve the storage space for storing the data. The method includes managing a reservation and a release of a storage space of the common storage in response to a request from the plurality of applications. The method includes assigning a releasing priority to each storage space of the common storage that is reserved. The method includes instructing to release the storage space with highest releasing priority when the plurality of applications request to reserve the storage space for the data and free storage space is insufficient for reserving the storage space for the data.

According to a third aspect of the present disclosure, a common storage management device is configured to be used for a system including a common storage and a plurality of electronic control devices connected with an in-vehicle network. Each of the plurality of electronic control devices are configured to execute at least one application. The at least one application is configured to write and read data in the common storage. The common storage management device includes at least one processor configured to manage a reservation and a release of a storage space of the common storage in response to a request from the at least one application. The at least one processor is configured to assign a releasing priority to each storage space of the common storage that is reserved. The at least one processor is configured to instruct to release the storage space with highest releasing priority when the at least one application requests to reserve the storage space for the data and free storage space is insufficient for reserving the storage space for the data.

DETAILED DESCRIPTION

In a comparative example of the present disclosure, after the uploading or the downloading of the data using the common storage is completed, the application determines that the data is no longer needed and performs a process of deleting the data from the common storage. When the common storage is shared by the applications and the use of the common storage is concentrated, the common storage may not be used due to lack of free storage space even when another application tries to use the common storage. In this case, the common storage can be used after the use by the application ends and the storage space is released, but the efficiency of using the common storage may deteriorate.

Embodiments of the present disclosure will be described hereinafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

Figure 1:
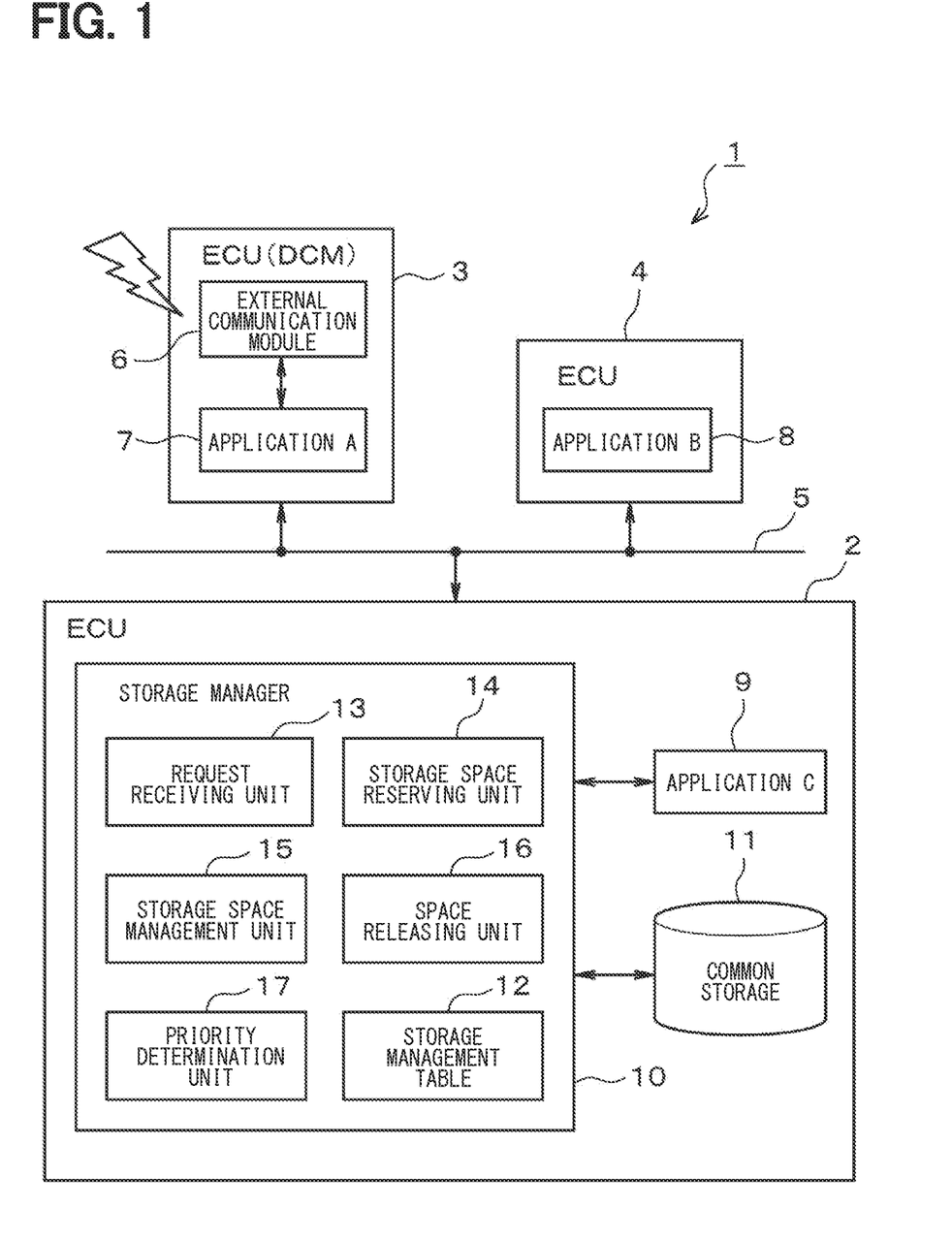
FIG. 1 is a block diagram illustrating an in-vehicle system according to a first embodiment.

Hereinafter, a common storage management device provided in an in-vehicle system mounted on a vehicle such as an automobile according to a first embodiment will be described with reference to FIGS. 1-4. FIG. 1 schematically shows configurations of an in-vehicle system 1 according to the present embodiment. The in-vehicle system 1 includes multiple ECUs (Electronic Control Units) 2, 3, 4 connected with each other through network 5 such as CAN (registered trademark) and Ethernet (registered trademark). Each ECUs includes a computer. In FIG. 1, three ECUs 2, 3, 4 are illustrated for convenience.

The ECU 3 is an ECU for controlling communication with the outside of the vehicle. The ECU 3 includes an external communication module 6 referred to as a DCM (Data Communication Module) and an application 7. The ECU 4 is an ECU for controlling various in-vehicle devices. The ECU 4 includes, for example, an ECU for driving control such as engine control, an ECU for body system control, an ECU for navigation control, an ECU for ETC control, an ECU for audio control, and an ECU for drive recorder control. The ECU 4 includes an application 8.

The ECU 2 is an ECU for a central gateway and functions as a hub in the network of the in-vehicle system 1. The ECU 2 includes an application 9. Each ECU 2, 3, 4 may include multiple applications. In the present embodiment, the ECU 2 functions as the common storage management device. In FIG. 1, the application 7 is denoted as "application A", the application 8 is denoted as "application B", and the application 9 is denoted as "application C".

In the in-vehicle system 1 of the present embodiment, the applications 7, 8, 9 of the ECUs 2, 3, 4 communicate with each other, and the external communication module 6 communicate with a center device of an external service company or the like through a communication network. In this case, the applications 7, 8, 9 of the ECUs 2, 3, 4 upload to and download from the center device.

Specifically, information transmitted to the center device includes diagnostic data detected by sensors mounted on the vehicle, data of a drive recorder, and the like. Information received from the center device includes update programs of software for the in-vehicle devices, map data for navigation that is updated at any given time among information referenced by in-vehicle devices, and music data played by audio devices.

The applications 7, 8, 9 temporarily uses storage space for uploading and downloading data, but preparing a dedicated storage space in each ECU 2, 3, 4 may be wasteful. In view of the above, a common storage 11 is provided in one ECU. In this embodiment, the common storage 11 is provided in the ECU 2. The applications 7, 8, 9 write data to the common storage 11 and delete data from the common storage 11 at any given time.

The functions of the ECU 2 as the common storage management device will be described. As described above, the ECU 2 includes the common storage 11. The ECU 2 further includes a storage manager 10 configured to reserve and release the storage space of the common storage 11 in response to requests by the applications 7, 8, 9. The storage manager 10 includes the storage management table 12. In the present embodiment, the storage management table 12 is configured to record management information containing the application that requested the reservation of the common storage 11, the volume of the reserved storage space, data of static releasing priority of the storage space, and the like.

The storage manager 10 is configured to realize functions as a request receiving unit 13, a storage space reserving unit 14, a storage space management unit 15, a space releasing unit 16, and a priority determination unit 17 by its hardware and software configurations. The request receiving unit 13 is configured to perform processes for receiving a request to reserve or release the storage space of the common storage 11 from the applications 7, 8, 9.

The storage space reserving unit 14 is configured to reserve the storage space of the common storage 11 in accordance with a reserving request to reserve the storage space received by the request receiving unit 13. When the storage space reserving unit 14 reserves the storage space of the common storage 11, the storage space reserving unit 14 assigns releasing priority to the storage space. In the present embodiment, static releasing priority is set based on at least a property of the data such as being uploaded or downloaded, or whether a volume of the storage space required for the data is greater than a predetermined size such as 200 MB. When the data is to be downloaded, the releasing priority is set to be higher than that of the data to be uploaded. Further, when the volume of the storage space required for the data exceeds the predetermined size, the releasing priority is set to be higher. For example, the static releasing priority is the releasing priority determined based on information that is already fixed at the time when the request receiving unit 13 receives the request to reserve the storage space of the common storage 11 from the application 7, 8, 9.

When the storage space reserving unit 14 reserves the storage space, the storage space reserving unit 14 inquires the storage space management unit 15 of the volume of free storage space of the storage space management unit 15, and requests the storage space management unit 15 to release used storage space when the free storage space is insufficient for the data to be stored. The storage space management unit 15 is configured to write management information of the storage space of the common storage 11 reserved by the storage space reserving unit 14 into the storage management table 12. The storage space management unit 15 is configured to instruct the space releasing unit 16 to release the storage space when the request receiving unit 13 receives the request from the application 7, 8, 9 to release the storage space.

Further, when the storage space management unit 15 is requested by the storage space reserving unit 14 to release the used storage space, the storage space management unit 15 requests the priority determination unit 17 to determine the releasing priority, and instructs the space releasing unit 16 to release the storage space in order of the releasing priority. The space releasing unit 16 is configured to release the storage space of the common storage 11 that is requested to release in accordance with the instruction from the storage space management unit 15. Further, the storage space management unit 15 is configured to delete the information of the released storage space from the management information in the storage management table 12 after the releasing of the storage space is completed.

The priority determination unit 17 is configured to determine the releasing priority of the storage space of the common storage 11 to be released when the request receiving unit 13 receives the request to reserve the storage space of the common storage 11. Accordingly, the storage manager 10 is configured to instruct to release the storage space with the highest releasing priority in order when the application 7, 8, 9 requests to reserve the storage space and the free storage space of the common storage 11 is insufficient.

The releasing of the storage space may be deleting the stored data, increasing the free storage space by compressing the stored data, or changing a status of the storage space that is reserved by the application but is not occupied by data into a state where the storage space can be reserved.

Figure 2:
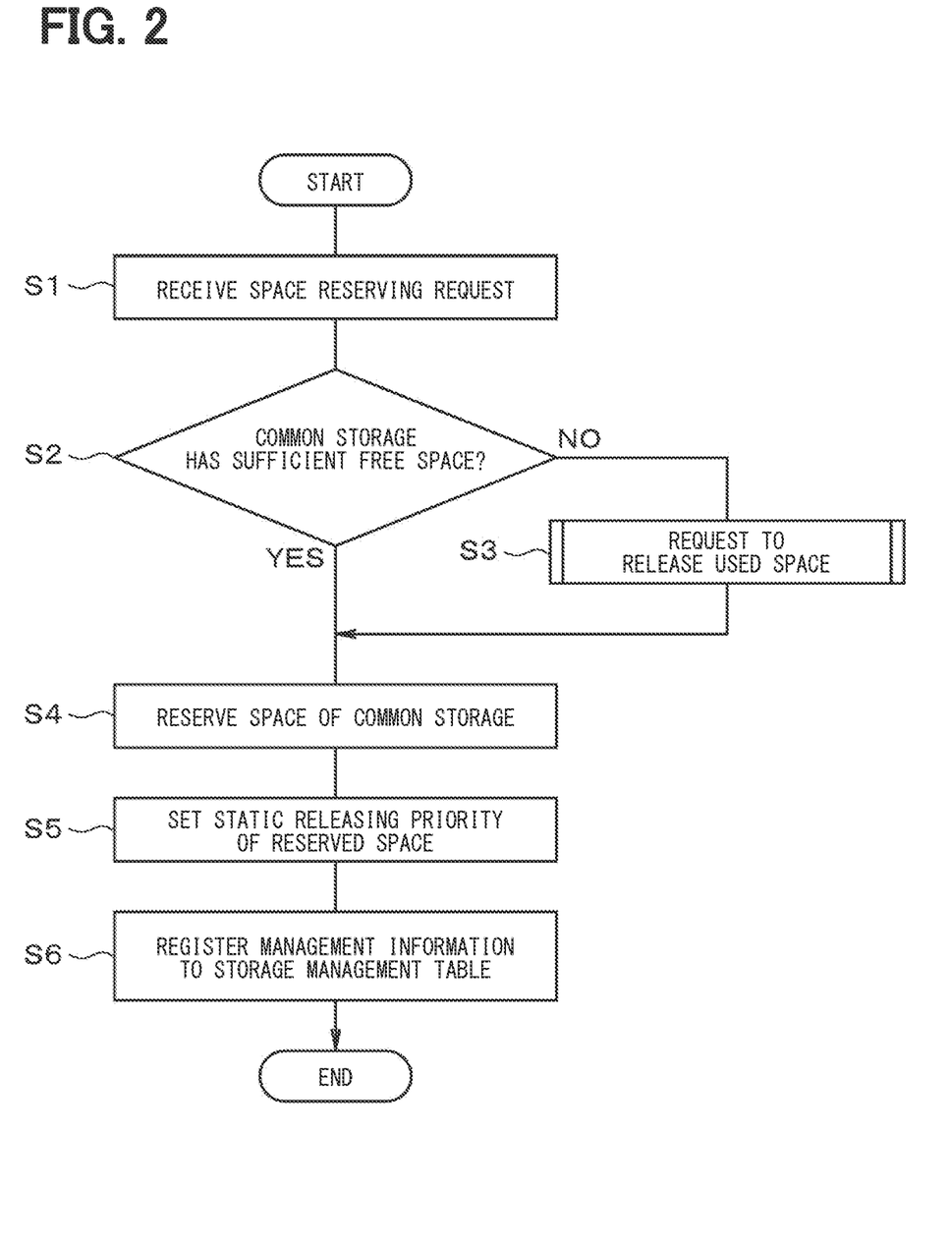
FIG. 2 is a flowchart illustrating processes performed by a storage manager to reserve a storage space.
Figure 3:
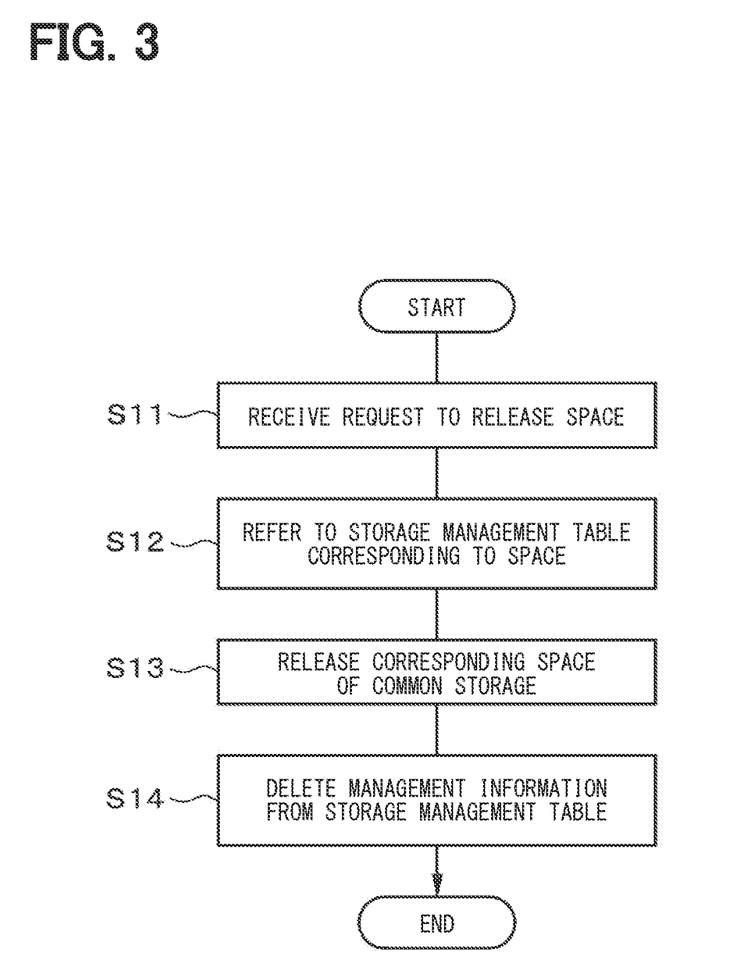
FIG. 3 is a flowchart illustrating processes performed by the storage manager in response to a request from an application to release the storage space.
Figure 4:
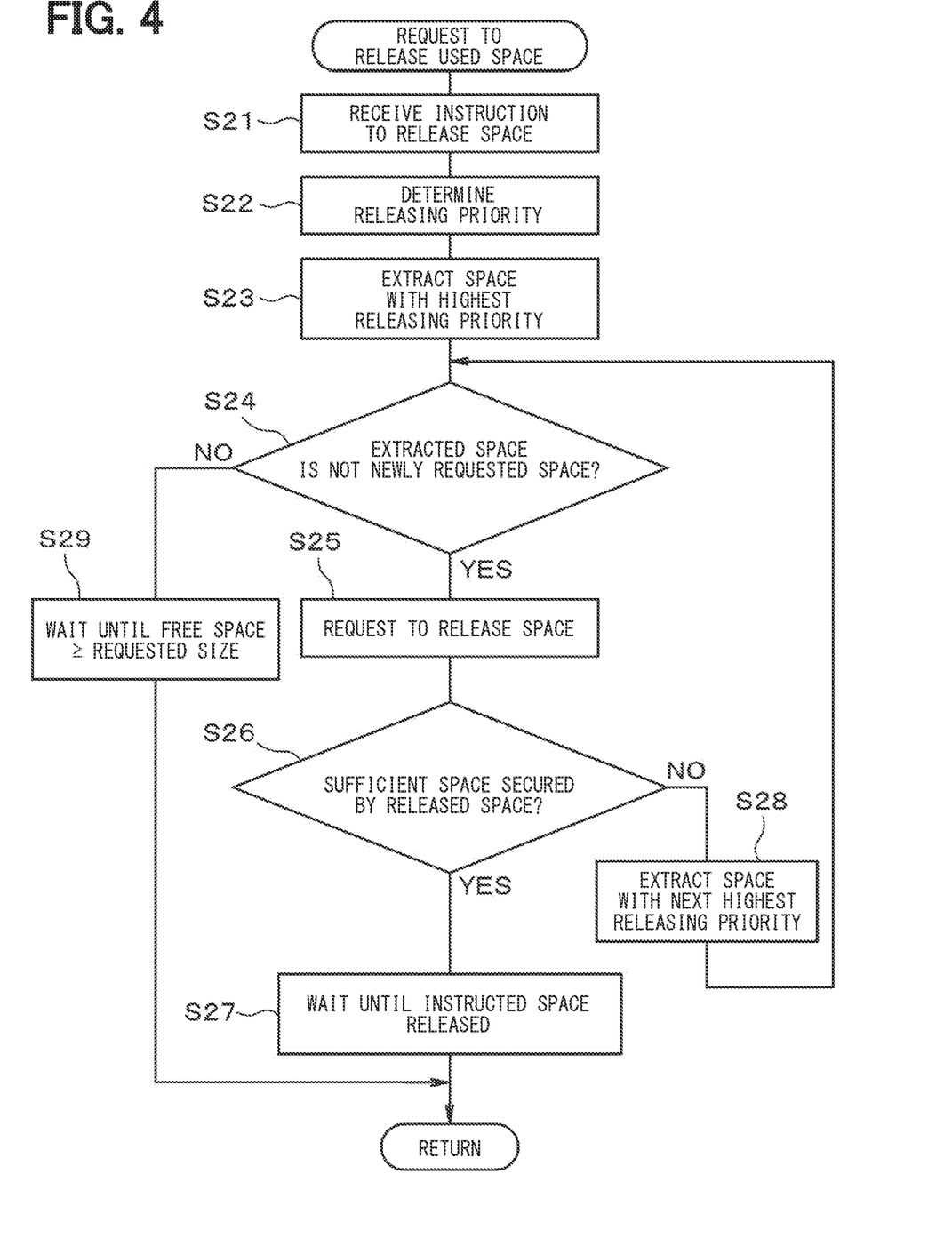
FIG. 4 is a flowchart illustrating detailed processes of step S3 shown in FIG. 2.

Next, the processes performed by the storage manager 10 will be described with reference to FIGS. 2-4. FIG. 2 is a flowchart illustrating processes performed by the storage manager 10 to reserve the storage space. FIG. 3 is a flowchart illustrating processes performed by the storage manager 10 to release the storage space when the application requests to release the storage space. FIG. 4 is a flowchart illustrating detailed processes in step S3 of FIG. 2 for releasing the used storage space. As a result of these processes, the common storage management method according to the present embodiment is performed.

First, when the reserving request to reserve the storage space is received in step S1 of FIG. 2, the storage space reserving unit 14 determines whether the common storage 11 has the free storage space required to reserve the storage space required by the application in step S2. That is, it is determined whether the common storage 11 has enough free space equal to or greater than the required data size requested by the application. When it is determined that the common storage 11 does not have enough free space to reserve the storage space required by the application (No in step S2), the processes for releasing the used storage space are performed in step S3, and the process proceeds to step S4. The details of the processes for releasing the storage space in step S3 will be described later with reference to FIG. 4.

When it is determined in step S2 that the common storage 11 has enough free storage space (Yes in step S2), the storage space reserving unit 14 reserves the required storage space of the common storage 11 in step S4. At the same time, in step S5, the static releasing priority is set for the reserved storage space. The releasing priority is set based on the properties of the data and the volume of the storage space required for the data as described above. That is, when the data is to be downloaded, the releasing priority is set to be higher than that of the data to be uploaded. Further, when the volume of the storage space required for the data exceeds the predetermined size, e.g. 200 MB, the releasing priority is set to be higher. In step S6, the management information is registered in the storage management table 12, and the process ends.

Next, as shown in FIG. 3 illustrating the processes performed when the application requests to release the storage space, the request receiving unit 13 receives the request from the application 7, 8, 9 to release the reserved storage space in step S11. Subsequently, in step S12, the storage space management unit 15 checks the information of the storage space to be released in the storage management table 12 based on the information of the storage space to be released and the application that requested the release of the storage space. In next step S13, the space releasing unit 16 receives the information of the storage space to be released from the storage space management unit 15, and releases the corresponding storage space of the common storage 11. After the release is performed, the storage space management unit 15 deletes the corresponding management information from the storage management table 12, and the process ends.

FIG. 4 is a flowchart illustrating the details of the processes in step S3 of FIG. 2 in which the storage manager 10 releases the used storage space. In step S21, when the storage space management unit 15 receives the instruction to release the storage space from the storage space reserving unit 14, the priority determination unit 17 is requested to determine the priority in step S22, and the releasing priorities of the storage spaces in the storage management table 12 are determined. In step S23, the storage space with the highest priority is extracted as a releasing target storage space. In addition to the storage space already reserved, the priority of the storage space for which new reserving request is made is determined.

In next step S24, it is determined whether the extracted releasing target storage space is not the storage space for which new reserving request is made, that is, whether the extracted releasing target storage space is the used storage space. When the releasing target storage space is the used storage space (Yes in step 24), the space releasing unit 16 is requested to release the corresponding storage space in step S25. In this case, the space releasing unit 16 performs the processes to release the storage space as shown in FIG. 3. In next step S26, it is determined whether the storage space having the required volume can be reserved by releasing the storage space.

When it is determined that the reserving request can be processed (Yes in step S26), the process returns after all the storage spaces that are instructed to be released are released in step S27. After the return, the required storage space of the common storage 11 is reserved. In contrast, when it is determined in step S26 that the reserving request cannot be processed, that is, when the free storage space is still insufficient even after the corresponding storage space is released (No in step S26), the storage space with the next highest priority is extracted as the next releasing target storage space in step S28, and the processes from step S24 are repeated.

When it is determined in step S24 that the extracted releasing target storage space is the storage space for which new reserving request is made (No in step S24), the process pauses until the free storage space of the common storage 11 becomes equal to or greater than the required size in step S29. That is, the process pauses until the current use of the common storage 11 by the application 7, 8, 9 ends to cause the free storage space equal to or greater than the required size, and then the process returns. After the return, the required storage space of the common storage 11 is reserved.

According to the common storage management device and the common storage management method of the present embodiment, the following operations and effects can be obtained. That is, the storage manager 10 is configured to manage the reserving and the releasing of the storage space of the common storage 11 in response to the request from the application 7, 8, 9. The storage manager 10 is configured to assign the releasing priority to the reserved storage spaces of the common storage 11. When the usage of the common storage 11 by the applications 7, 8, 9 is concentrated, the free storage space of the common storage 11 may be insufficient to reserve the required storage space requested by another application 7, 8, 9. In this case, the storage manager 10 instructs to release the storage space with the highest releasing priority in order.

Accordingly, the storage manager 10 is configured to release the storage space with the highest releasing priority in order without waiting for the delete of the data in the storage space of the common storage 11 by the application 7, 8, 9, and the required storage space can be reserved by releasing the storage space in response to the request from the application 7, 8, 9. As a result, the storage space of the common storage 11 can be used efficiently in the system including the common storage 11 shared with the applications 7, 8, 9.

In particular, in the present embodiment, the storage manager 10 is configured to assign the static releasing priority based on at least one of the property of the data used by the application 7, 8, 9 or the volume of the storage space required for the data. Accordingly, when the data is to be downloaded, that means the importance is relatively low, a high releasing priority is assigned. In this way, the storage space with low importance is released in order while the important storage space is remained. Further, when the required data size is greater than the predetermined volume, e.g. 200 MB, a high releasing priority is assigned. In this way, the storage space with large size is preferentially released, and the effect of the releasing is increased.

Second Embodiment and Other Embodiments

Next, a second embodiment will be described with reference to FIGS. 5-7. The second embodiment is different from the first embodiment in the processes for reserving the storage space of the common storage 11 performed by the storage manager 10. In the present embodiment, when there are multiple reserving requests that have not been processed, the storage manager 10 assigns reserving priorities to the reserving requests and processes the reserving request with the highest reserving priority in order.

Figure 5:
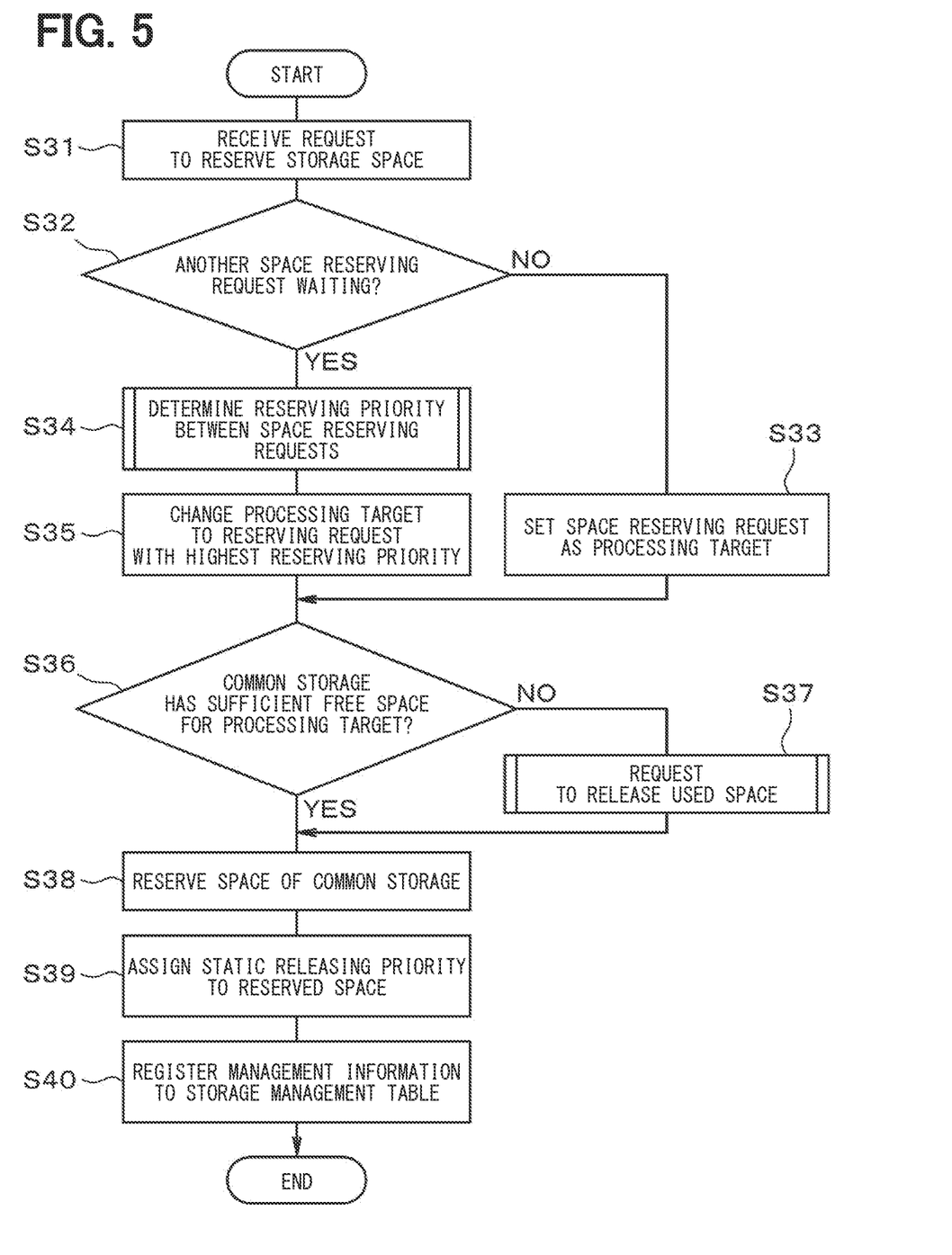
FIG. 5 is a flowchart illustrating processes performed by a storage manager to reserve a storage space according to a second embodiment.
Figure 6:
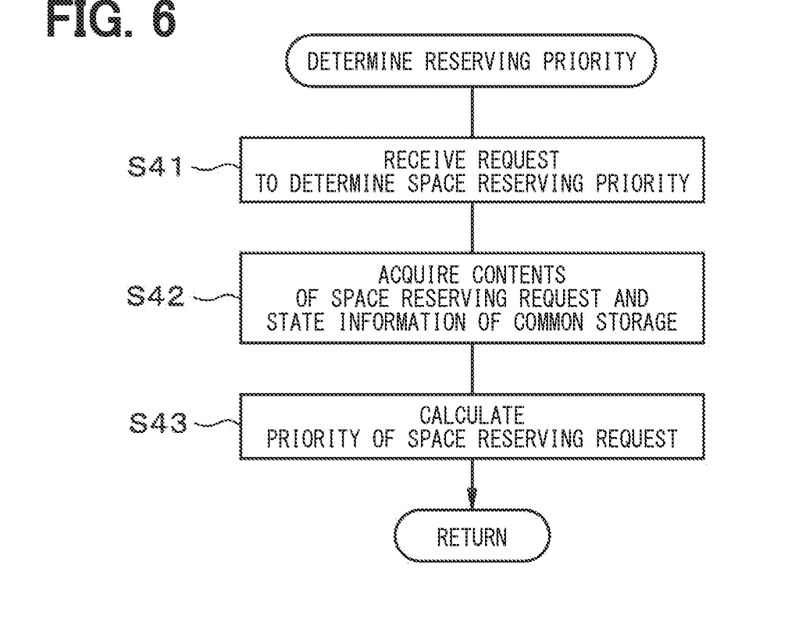
FIG. 6 is a flowchart illustrating detailed processes of step S34 shown in FIG. 5.

FIG. 5 is a flowchart illustrating processes performed by the storage manager 10 to reserve the storage space, and FIG. 6 is a flowchart illustrating the detailed procedure of determining the reserving priority in step S34 of FIG. 5. In step S31 of FIG. 5, when the reserving request to reserve the storage space is made by the application 7, 8, 9, it is determined whether another reserving request is waiting for being processed in step S32. When there is no other reserving request (No in step S32), the reserving request is set as a processing target, and the process proceeds to step S36.

In contrast, when it is determined that there is another reserving request in step S32 (Yes in step S32), the reserving priorities of the waiting reserving requests are determined in step S34. The details of the processes for determining the reserving priorities in step S34 will be described later with reference to FIGS. 6, 7. After the reserving priorities are determined, the reserving request with the highest reserving priority is set as the processing target in step S35, and the process proceeds to step S36. Steps S36-S40 are the same as steps S2-S6 of the first embodiment shown in FIG. 2, and the descriptions are omitted.

Next, the flowchart shown in FIG. 6 illustrates the details of the processes in step S34 of FIG. 5, that is, the processes performed by the storage manager 10 to determine the reserving priorities. That is, in step S41, the priority determination unit 17 receives a request from the storage space reserving unit 14 to determine the reserving priorities. In next step S42, the priority determination unit 17 acquires the contents of the reserving request and the current status of the common storage 11, that is, the data of the free storage space. In the present embodiment, the contents of the reserving request include an order of the request, the volume of the required storage space, and the property of the data, that is, uploading or downloading. In step S43, the reserving priority of each reserving request is calculated, and the process returns.

Here, an specific example of the calculation of the reserving priority performed in step S43 will be explained with reference to FIG. 7. In order to calculate the reserving priority, n conditions X1, X2, ..., Xn are quantified, and the priority is calculated using the following function with weighting A1, A2, ..., An for the conditions.

$$\text{Priority } Y1 = A1X1 + A2X2 + \ldots + AnXn \quad (1)$$

For example, n=3, X1=(the number of the reserving request waiting for being processed−the order of the request)/(the number of the reserving request), X2=1−(required volume/the volume of the free storage space of the common storage), X3=the property of the data (e.g. 1 for upload, 0 for download), A1=2/4, A2=1/4, and A3=1/4. The higher the value of priority Y1 is, the higher the reserving priority is.

Figure 7:
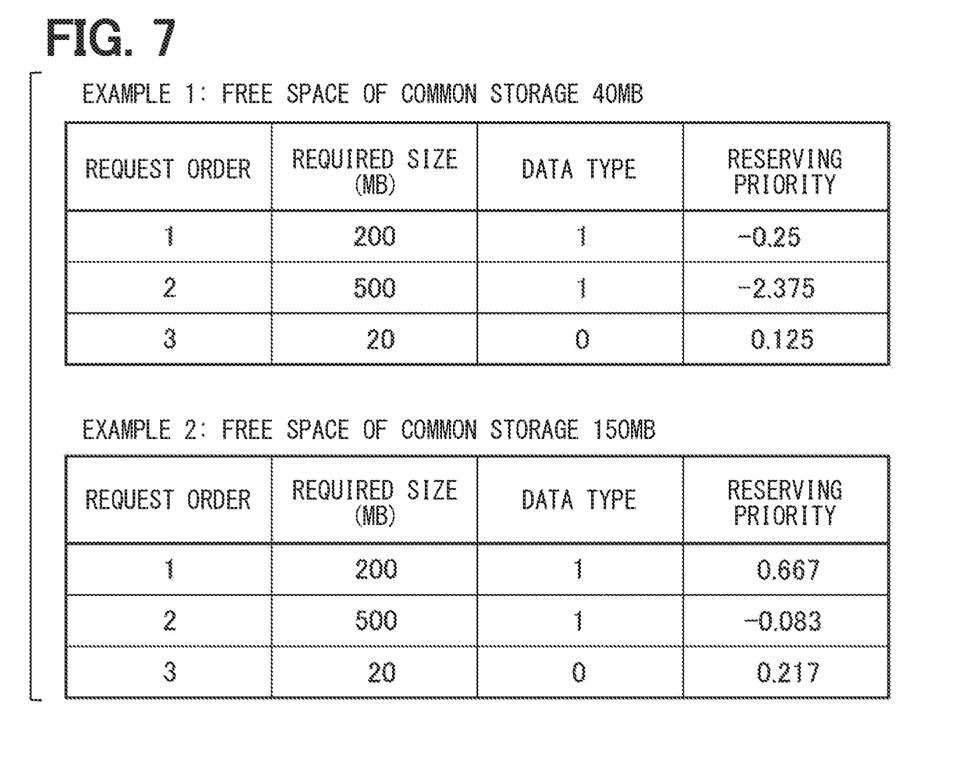
FIG. 7 is a drawing illustrating examples of calculation of reserving priority.

FIG. 7 shows examples of the calculation results of the priority Y in a case where the volume of the free storage space of the common storage 11 is 40 MB, and a case where the volume of the free storage space is 150 MB. When the free storage space is 40 MB, the reserving priority of the third request is the highest. In contrast, when the free storage space is 150 MB, the reserving priority of the first request is the highest. However, the above conditions and weighting values are just examples, and need to be determined according to actual use. For example, when the data is to be downloaded, the priority, i.e. the value of X3, may be larger.

According to the second embodiment, the same operations and effects as the first embodiment can be obtained. In addition, when there are multiple reserving requests that have not been processed, the storage manager 10 assigns the reserving priorities to the reserving requests, and reserves the storage space of the common storage 11 in order. Since the order of requests, the required data size, the property of the data, and the current free storage space of the common storage are used as conditions for determining the reserving priority, the reserving priority can be determined appropriately.

In the first embodiment, the releasing priority is statically assigned based on at least one of the property of the data or the volume of the storage space required for data to be stored. However, in order to determine the storage space to be instructed to release, the static releasing priority may be combined with dynamic conditions including at least one of the order of the request or the volume of current free storage space of the common storage. For example, the releasing priority may be calculated as in the function (1) by quantifying the static releasing priority, the order of the request, and the volume of the current free storage space and weighting those. According to this, the releasing priority can be determined more precisely.

In the above-described embodiments, the ECU 2 for the central gateway includes the common storage 11 and has the function of the storage manager 10. However, another ECU may have the common storage 11 and that function instead of the ECU 2. In the above-described embodiment, the present disclosure is explained with an example using the in-vehicle system 1 in which the ECUs are connected with each other through the network. However, the present disclosure may be used for any system including one or more computers in a closed network.

The formulas, conditions, and specific numerical values for calculating the reserving priority and the releasing priority may be implemented with appropriate changes. Although the present disclosure has been described in accordance with embodiments, it is understood that the present disclosure is not limited to such embodiments or structures. The present disclosure encompasses various modifications and variations within the scope of equivalents. In addition, various combinations and forms, and further, other combinations and forms including only one element, or more or less than these elements are also within the sprit and the scope of the present disclosure.

Although the present disclosure has been fully described in connection with the preferred embodiments thereof with reference to the accompanying drawings, it is to be noted that various changes and modifications will become apparent to those skilled in the art.

Additional advantages and modifications will readily occur to those skilled in the art. The disclosure in its broader terms is therefore not limited to the specific details, representative apparatus, and illustrative examples shown and described.

What is claimed is:

1. A common storage management device for a system including a common storage having a plurality of storage spaces and at least one computer connected with each other by a closed network, the at least one computer including one computer configured to communicate with an outside, the at least one computer storing a plurality of applications configured to communicate with each other, the plurality of applications being configured to write and read data in the common storage, the common storage management device comprising:
   at least one processor configured to
      manage a reservation and a release of a storage space of the plurality of storage spaces of the common storage in response to a request from the plurality of applications,
      assign a releasing priority to each storage space of the plurality of storage spaces of the common storage that is reserved and to the request,
      compare the releasing priority of the request with a highest releasing priority among the releasing priorities assigned to the plurality of storage spaces, and
      instruct to release the storage space of the plurality of storage spaces with the highest releasing priority when the plurality of applications request to reserve the storage space for the data and free storage space is insufficient for reserving the storage space for the data and when the highest releasing priority among the releasing priorities assigned to the plurality of storage spaces is higher than the releasing priority of the request.

2. The common storage management device according to claim 1, wherein
   the at least one processor is configured to assign a static releasing priority, as the releasing priority, based on at least one of a property of the data or a volume of the storage space required for the data.

3. The common storage management device according to claim 1, wherein
   the at least one processor is configured to determine the storage space to be released based on the releasing priority and a dynamic condition including at least one of an order of the request or a volume of current free storage space of the common storage.

4. The common storage management device according to claim 1, wherein
   when there are multiple requests to reserve the storage space that have not been processed, the at least one processor
      assigns different reserving priorities to the requests based on a condition including at least one of an order of the requests, a volume of the storage space required for the data, a property of the data, or a volume of current free storage space of the common storage, and
      process the requests in order of the reserving priorities.

5. The common storage management device according to claim 1, wherein the at least one processor is further configured to receive the request from the plurality of applications to reserve and release the storage space of the common storage.

6. A method of managing a common storage for a system including the common storage and at least one computer connected with each other by a closed network, the at least one computer including one computer configured to communicate with an outside, the at least one computer storing a plurality of applications configured to communicate with each other, the plurality of applications being configured to write and read data in the common storage, the common storage having a plurality of storage spaces, the method comprising:
   managing a reservation and a release of a storage space of the plurality of storage spaces of the common storage in response to a request from the plurality of applications; and
   assigning a releasing priority to each storage space of the plurality of storage spaces of the common storage that is reserved and to the request,
   comparing the releasing priority of the request with a highest releasing priority among the releasing priorities assigned to the plurality of storage spaces, and
   instructing to release the storage space of the plurality of storage spaces with the highest releasing priority when the plurality of applications request to reserve the storage space for the data and free storage space is insufficient for reserving the storage space for the data and when the highest releasing priority among the releasing priorities assigned to the plurality of storage spaces is higher than the releasing priority of the request.

7. A common storage management device for a system including a common storage having a plurality of storage spaces and a plurality of electronic control devices connected with an in-vehicle network, each of the plurality of electronic control devices being configured to execute at least one application, the at least one application being configured to write and read data in the common storage, the common storage management device comprising:
   at least one processor configured to:

manage a reservation and a release of a storage space of the plurality of storage spaces of the common storage in response to a request from the at least one application; and assign a releasing priority to each storage space of the plurality of storage spaces of the common storage that is reserved and to the request, compare the releasing priority of the request with a highest releasing priority among the releasing priorities assigned to the plurality of storage spaces, and instruct to release the storage space of the plurality of storage spaces with the highest releasing priority when the at least one application requests to reserve the storage space for the data and free storage space is insufficient for reserving the storage space for the data and when the highest releasing priority among the releasing priorities assigned to the plurality of storage spaces is higher than the releasing priority of the request.

\* \* \* \* \*